(12) United States Patent
Wehner

(10) Patent No.: US 7,096,662 B2
(45) Date of Patent: Aug. 29, 2006

(54) VARIABLE AREA THROAT EXHAUST NOZZLE WITH VECTORABLE SIDEWAYS SHIFTING OF EXHAUST FLOW

(75) Inventor: Edward James Wehner, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 306 days.

(21) Appl. No.: 10/952,118

(22) Filed: Sep. 28, 2004

(65) Prior Publication Data

US 2006/0064962 A1 Mar. 30, 2006

(51) Int. Cl.
*F02K 1/00* (2006.01)

(52) U.S. Cl. .............. 60/232; 60/770; 239/265.19
(58) Field of Classification Search ............. 60/228, 60/230, 232, 770, 771; 239/265.19, 265.35
See application file for complete search history.

(56) References Cited

U.S. PATENT DOCUMENTS

| | | | | |
|---|---|---|---|---|
| 3,096,049 A * | 7/1963 | Karasinski | ................. | 244/52 |
| 4,023,105 A * | 5/1977 | Woolling, Jr. | ............ | 340/825.26 |
| 4,110,972 A * | 9/1978 | Young et al. | ................. | 60/230 |
| 4,241,876 A | 12/1980 | Pedersen | | |
| 4,280,660 A * | 7/1981 | Wooten et al. | ............ | 239/265.35 |
| 4,641,782 A * | 2/1987 | Woodward | ................. | 239/265.29 |
| 4,747,543 A * | 5/1988 | Madden | ................. | 239/127.3 |
| 4,801,087 A * | 1/1989 | Woodard | ................. | 239/127.1 |
| 4,848,664 A * | 7/1989 | Thayer | ................. | 239/265.29 |
| 4,978,071 A * | 12/1990 | MacLean et al. | ............ | 239/265.19 |
| 5,016,818 A * | 5/1991 | Nash et al. | ............ | 239/127.1 |
| 5,050,803 A * | 9/1991 | Wakeman et al. | ............ | 239/265.35 |
| 5,082,181 A * | 1/1992 | Brees et al. | ............ | 239/265.35 |
| 5,092,524 A | 3/1992 | Garrett et al. | | |
| 5,142,862 A * | 9/1992 | Brown | ................. | 60/226.2 |
| 5,261,604 A * | 11/1993 | Meyer | ................. | 239/265.19 |
| 5,294,055 A | 3/1994 | Garrett et al. | | |
| 5,335,489 A * | 8/1994 | Thayer | ................. | 60/230 |
| 5,431,344 A * | 7/1995 | Novotny et al. | ............ | 239/265.35 |
| 5,437,412 A * | 8/1995 | Carletti | ................. | 239/265.25 |
| 5,511,376 A * | 4/1996 | Barcza | ................. | 60/230 |
| 5,833,139 A * | 11/1998 | Sondee et al. | ............ | 239/265.17 |
| 6,857,600 B1 * | 2/2005 | Walker et al. | ............ | 244/73 R |
| 6,948,317 B1 * | 9/2005 | Renggli et al. | ................. | 60/771 |
| 2003/0145599 A1* | 8/2003 | Renggli et al. | ................. | 60/771 |

\* cited by examiner

*Primary Examiner*—William H. Rodriguez
(74) *Attorney, Agent, or Firm*—William Scott Andes; Steven J. Rosen

(57) ABSTRACT

A nozzle includes a sideways split and aftwardly swept nozzle ramp extends between a fixed lower nozzle wall and a pivotal upper nozzle wall pivotally connected to an aft end of the nozzle and operable to vary a throat area of a throat of the nozzle. The upper and lower nozzle walls and the ramp extend transversely between first and second nozzle sidewalls. A sideways pivotable ramp structure pivotally connected to the lower nozzle wall and pivotable between the sidewalls includes a longitudinally extending upper pivotable wall spaced upwardly and aftwardly of a longitudinally extending lower pivotable wall and an aftwardly swept pivotable ramp extending between the upper and lower pivotable walls. Right hand and left hand upper ramp sections of the nozzle ramp may be connected to right hand and left hand upper nozzle wall sections respectively of the upper nozzle wall which are pivotally connected to right and left handed triangular side walls of the aft end.

50 Claims, 7 Drawing Sheets

VARIABLE AREA THROAT EXHAUST NOZZLE WITH VECTORABLE SIDEWAYS SHIFTING OF EXHAUST FLOW

BACKGROUND OF THE INVENTION

Field of the Invention

The invention relates to aircraft gas turbine engine two dimensional vectoring nozzles and, more particularly, for such nozzles designed to shift center of nozzle exhaust flow sideways to effect vectoring.

Aircraft designers and, particularly, those designing high speed highly maneuverable military aircraft are constantly seeking better ways for controlling the aircraft and increasing its maneuverability in flight. These are needed for anti-aircraft missile avoidance and other combat maneuvers. Additionally, aircraft designers are trying to improve short take-off and landing capabilities of aircraft. Exhaust systems, particularly for modern, high speed, military aircraft, have been adapted to provide a high degree of maneuverability over a wide variety of flight conditions including altitude, speed, and Mach number while maintaining cruise efficiency and during afterburning.

Aircraft maneuverability may be provided by aircraft control surfaces such as wing flaps or ailerons or vertical fins or rudders. Aircraft control surfaces, however, are somewhat limited in their effectiveness because of large differences in operational flight conditions such as air speed. Aircraft control surfaces also increase an aircraft's radar signature making it more vulnerable to anti-aircraft fire and missile. Thrust vectoring nozzles, though often more complicated, are more effective because they allow large thrust loads to be quickly applied in the pitch and yaw direction of the aircraft, thereby, providing the aircraft with enhanced maneuverability which is relatively independent of air speed. Afterburning thrust vectoring nozzles are complex, heavy, and expensive. Other thrust vectoring methods include use of nozzle internal fluidic injection and/or mechanical flow diversion devices to skew the thrust. Afterburning nozzles require variable throat areas, often referred to as A8, to open and accept the increased mass flow of the exhaust during afterburning. These thrust vectoring methods are effective but may be complex, heavy, costly and/or marginally effective.

It is, thus, highly desirable to provide an aircraft gas turbine engine with a variable throat area thrust vectoring nozzle that is not complex, nor heavy, nor expensive, and yet, very effective for thrust vectoring both during afterburning and non-afterburning nozzle operation.

SUMMARY OF THE INVENTION

An aircraft gas turbine engine variable throat area nozzle includes a longitudinally extending upper nozzle wall spaced upwardly and aftwardly of a longitudinally extending lower nozzle wall. A sideways split and aftwardly swept nozzle ramp extends between upper and lower nozzle walls, respectively. The upper and lower nozzle walls and the nozzle ramp extend transversely between first and second nozzle sidewalls of the nozzle. An outer nozzle wall is spaced apart from the upper and lower nozzle walls and extends transversely between the first and second nozzle sidewalls such that a nozzle flowpath is defined between the upper and lower nozzle walls and the outer nozzle wall and the first and second nozzle sidewalls. A variable area throat extends substantially downward across the nozzle flowpath from the outer nozzle wall to the upper nozzle wall. An upper ramp section of the aftwardly swept nozzle ramp is connected to the upper nozzle wall and the upper nozzle wall is upwardly and downwardly pivotally connected by a hinge to an aft end of the nozzle and operable to vary a throat area of the throat. The variable throat area nozzle is designed for use in an aircraft gas turbine engine exhaust section in which the variable throat area nozzle is spaced axially downstream of an afterburner.

In a more particular embodiment, the nozzle includes a longitudinally extending and longitudinally split upper nozzle wall spaced upwardly and aftwardly of a longitudinally extending lower nozzle wall. A sideways split and aftwardly swept nozzle ramp extends between the upper and lower nozzle walls. The upper and lower nozzle walls and the nozzle ramp extend transversely or sideways between first and second nozzle sidewalls. An outer nozzle wall is spaced upwardly of and apart from the upper and lower nozzle walls and extends transversely between the first and second nozzle sidewalls. A nozzle flowpath is defined between the upper and lower nozzle walls, the outer nozzle wall, and the first and second nozzle sidewalls. The variable area throat extends substantially downwardly across the nozzle flowpath from the outer nozzle wall to the upper nozzle wall.

Right hand and left hand upper ramp sections of the aftwardly swept nozzle ramp are connected to right hand and left hand upper nozzle wall sections, respectively, of the upper nozzle wall. The right hand and left hand upper nozzle wall sections include right and left handed triangular sides, respectively. The right hand and left hand upper nozzle wall sections are upwardly and downwardly pivotally connected by right and left handed hinges along the right and left handed triangular sides of the right hand and left hand upper nozzle wall sections to right and left handed triangular side walls of an aft end of the nozzle. The throat area of the throat is varied by upwardly and downwardly pivoting the right hand and left hand upper nozzle wall sections about the right and left handed hinges, respectively.

A vectorable embodiment of the aircraft gas turbine engine variable throat area nozzle further a sideways pivotable ramp structure pivotally connected to the lower nozzle wall and pivotable between the sidewalls. The sideways pivotable ramp structure includes a longitudinally extending upper pivotable wall spaced upwardly and aftwardly of a longitudinally extending lower pivotable wall and an aftwardly swept pivotable ramp extending between the upper and lower pivotable walls.

In an exemplary embodiment of the vectorable nozzle, the upper pivotable wall includes a widthwise aftwardly tapered section which may have an isosceles triangular planform area including side edges extending equi-angularly aftwardly from a base line between the tapered section and a non-tapered section of the upper pivotable wall. Taper angles between the side edges and the base line may be sized for allowing the side edges to substantially abut respective ones of the sidewalls when the pivotable ramp structure is pivoted sideways.

A fin may be attached to the pivotable ramp structure along at least longitudinally extending first and second portions of the lower pivotable wall and the pivotable ramp respectively, and may extend longitudinally over a pivot point where the ramp structure is pivotally connected to the lower fixed wall.

A more particular embodiment of the vectorable nozzle includes a widthwise aftwardly tapered section of the upper pivotable wall and a base line between the tapered section and a non-tapered section of the upper pivotable wall. The variable area throat extends substantially downwardly across the nozzle flowpath from the outer nozzle wall to the ramp structure, and the tapered and non-tapered sections are contoured so that the throat extends widthwise substantially along the base line during vectored and unvectored operation of the nozzle.

Another more particular embodiment of the vectorable nozzle includes an upper triangular surface of the upper fixed wall bounding nozzle flowpath and at least a portion of the upper triangular surface extending aftwardly of the first and second fixed sidewalls to an apex of the triangular surface.

DETAILED DESCRIPTION OF THE INVENTION

Figure 1:
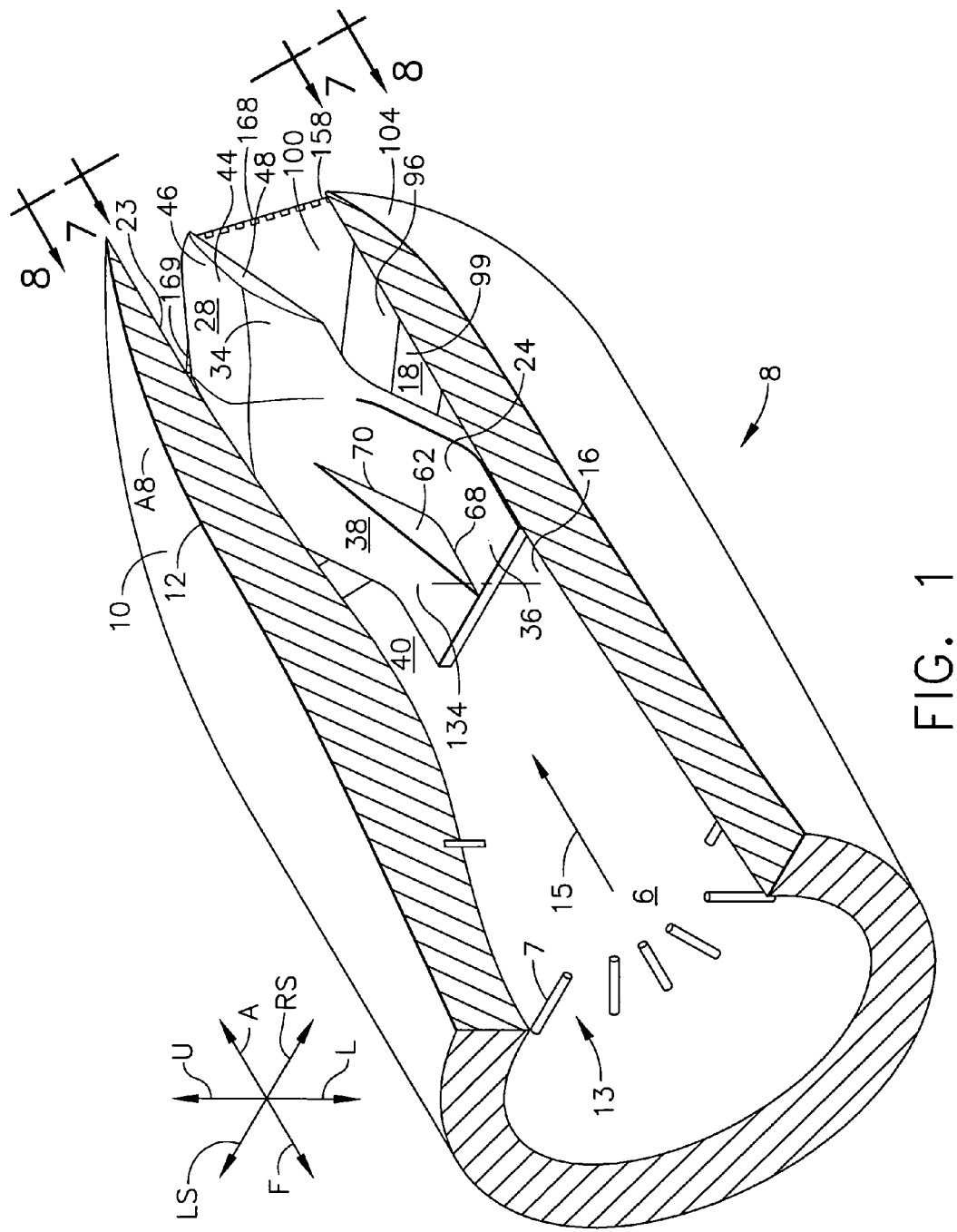
FIG. 1 is a partially cut-away perspective view illustration of an aircraft gas turbine engine exhaust section with an afterburner and a variable throat area vectorable nozzle with a sideways pivotable ramp.
Figure 2:
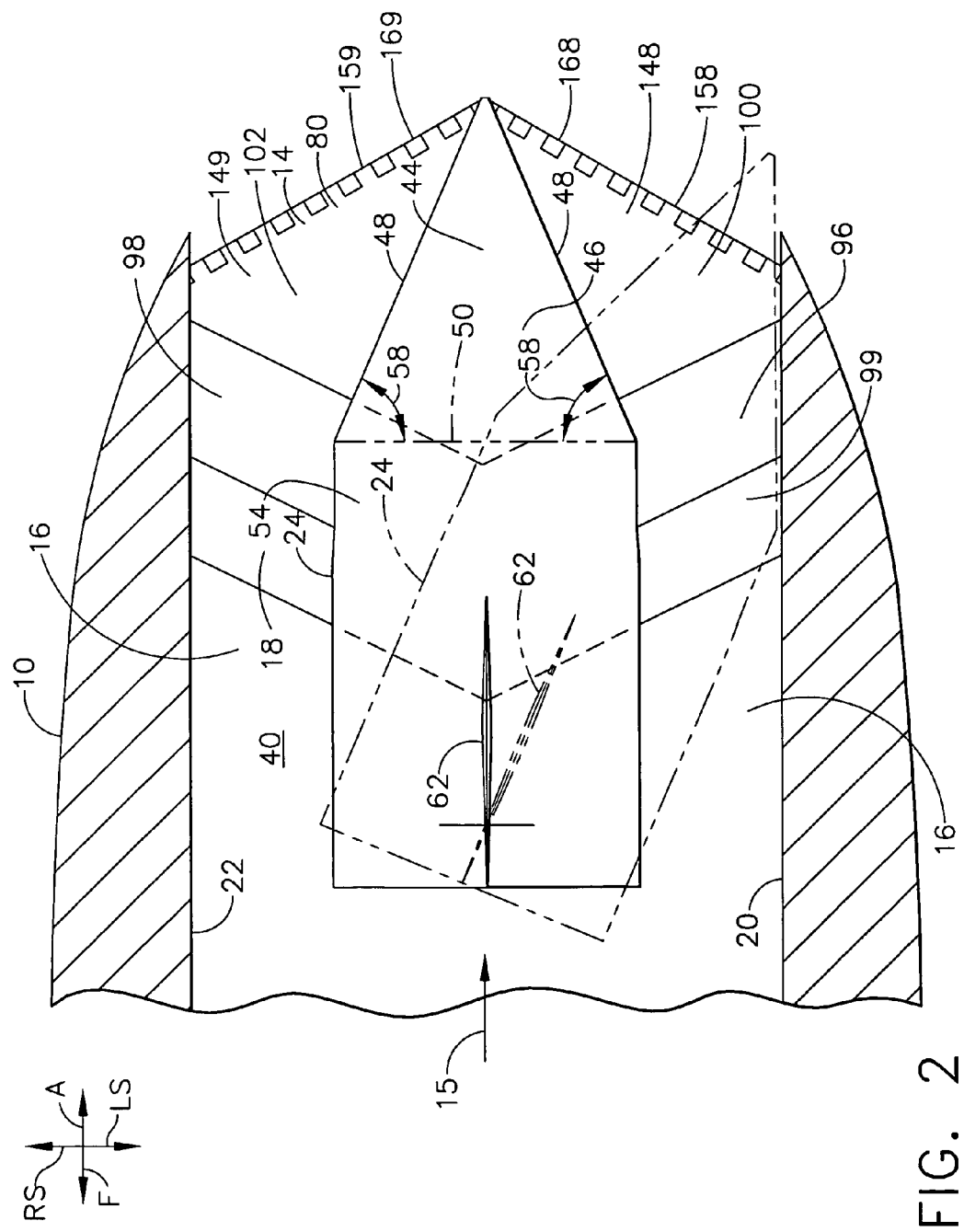
FIG. 2 is a cross-section top looking down view illustration of the vectorable nozzle in FIG. 1.

Illustrated in FIGS. 1 and 2 is an exemplary embodiment of an aircraft gas turbine engine exhaust section 8 having a variable throat area vectorable nozzle 12 located downstream of an afterburner 6 having a circumferential array of fuel injectors 7. The afterburner, often referred to as a thrust augmenter, is used to burn additional fuel for thrust. Afterburners are often used in military aircraft and also in supersonic aircraft of both the military and commercial type. Afterburning usually requires a wider throat than non-afterburning operation.

The variable throat area vectorable nozzle 12 illustrated in FIGS. 1–8 is designed to both vary the throat area A8 of the nozzle 12 and vector exhaust flow 15 sideways. The exhaust section 8 includes an outer casing 10 which is connected to an aft end of an aircraft gas turbine engine (not shown) by a transition duct 13. The transition duct 13 converts the exhaust flow 15 from one with a circular cross-section or axisymmetric exhaust flow 15 to one having a rectangular cross-section or two-dimensional (2D) exhaust flow 15. At this point, it is important to define the conventions used to describe the directions and frame of references for the flow, the movement of various nozzle elements. Forward and aft directions F and A are illustrated in FIG. 1 by respective arrows. Left and right sideway directions LS and RS are illustrated in FIG. 1 by respective arrows from a frame of reference forward looking aft. Upper and lower directions U and L are illustrated in FIG. 1 by respective arrows. Upper and lower elements and right and left elements are used only for describing the nozzle within the illustrated reference frame.

Figure 6:
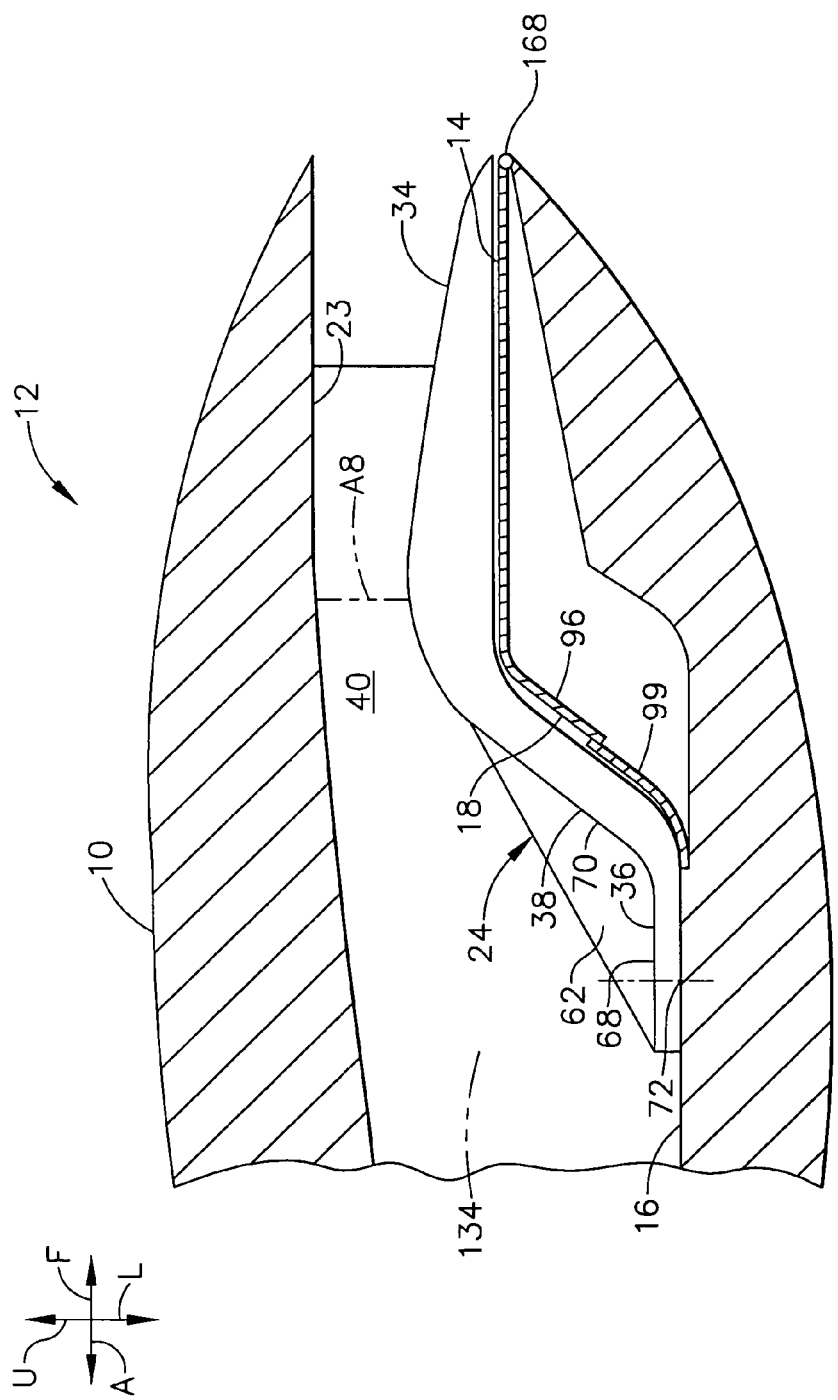
FIG. 6 is a cross-section side view illustration of the vectorable nozzle in FIG. 1.

Referring to FIGS. 1, 2, and 6, the variable throat area vectorable nozzle 12 includes a longitudinally extending and longitudinally split upper nozzle wall 14 spaced upwardly and aftwardly of a longitudinally extending lower nozzle wall 16. A sideways split and aftwardly swept nozzle ramp 18 extends between the upper and lower nozzle walls 14 and 16. The upper and lower nozzle walls 14 and 16 and the nozzle ramp 18 extend transversely or sideways between first and second nozzle sidewalls 20 and 22. An outer nozzle wall 23 spaced is upwardly of and apart from the upper and lower nozzle walls 14 and 16 and extends transversely between the first and second nozzle sidewalls 20 and 22. A nozzle flowpath 40 is defined between the upper and lower nozzle walls 14 and 16, the outer nozzle wall 23, and the first and second nozzle sidewalls 20 and 22. The variable area throat 28 extends substantially downwardly across the nozzle flowpath 40 from the outer nozzle wall 23 to the upper nozzle wall 14.

Figure 7:
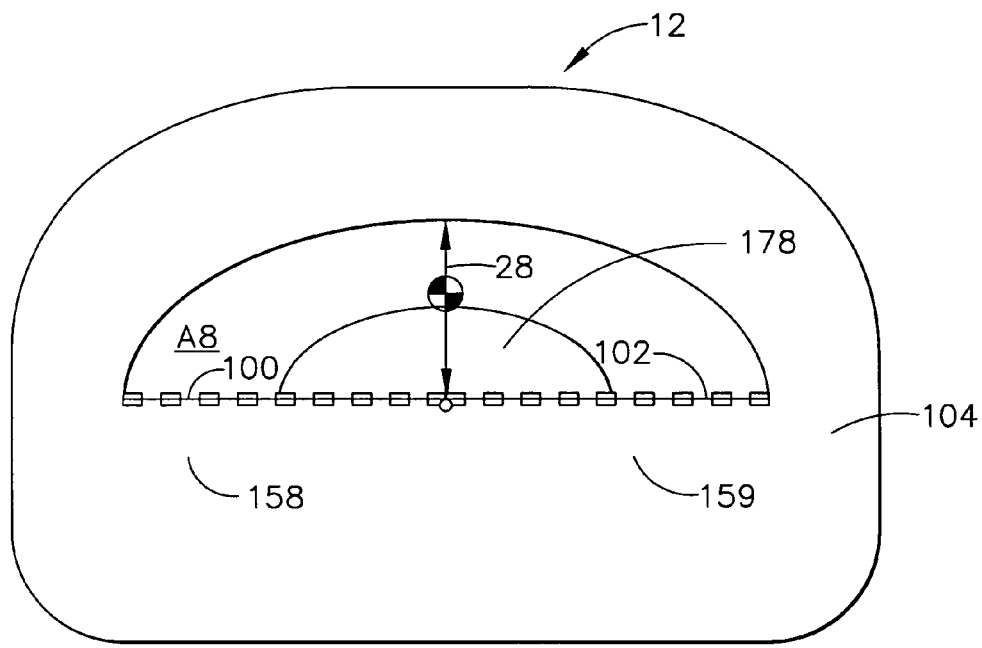
FIG. 7 is an aft looking forward end view illustration of the nozzle in FIG. 1 in a minimum throat area configuration.
Figure 8:
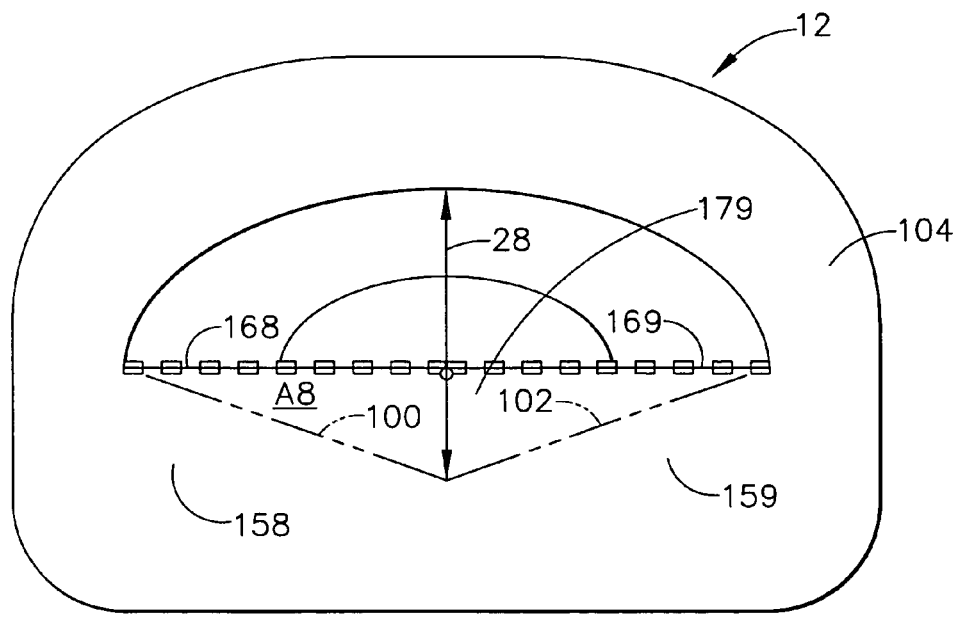
FIG. 8 is an aft looking forward end view illustration of the nozzle in FIG. 1 in a maximum throat area configuration.

Right hand and left hand upper ramp sections 96 and 98 of the aftwardly swept nozzle ramp 18 are connected to right hand and left hand upper nozzle wall sections 100 and 102, respectively, of the upper nozzle wall 14. The right hand and left hand upper nozzle wall sections 100 and 102 include right and left handed triangular sides 148 and 149, respectively. The right hand and left hand upper nozzle wall sections 100 and 102 are upwardly and downwardly pivotally connected by right and left handed hinges 168 and 169 along the right and left handed triangular sides 148 and 149 of the right hand and left hand upper nozzle wall sections 100 and 102 to right and left handed triangular side walls 158 and 159 of an aft end 104 of the nozzle 12 as illustrated in FIGS. 7 and 8. The right hand and left hand upper ramp sections 96 and 98 are disposed aftwardly and longitudinally behind and in sliding sealing engagement with a lower ramp section 99 of the aftwardly swept nozzle ramp 18 as illustrated in FIG. 6.

The throat area A8 of the throat 28 is varied by upwardly and downwardly pivoting the right hand and left hand upper nozzle wall sections 100 and 102 about the right and left handed hinges 168 and 169, respectively. FIG. 7 illustrates the right hand and left hand upper nozzle wall sections 100 and 102 in fully upwardly pivoted positions corresponding to a minimum throat area configuration 178 of the throat 28 with the throat area A8. FIG. 8 illustrates the right hand and left hand upper nozzle wall sections 100 and 102 in fully downwardly pivoted positions corresponding to a maximum throat area configuration 179 of the throat 28 with its throat area A8 substantially larger than the minimum throat area configuration 178 of the throat 28.

Referring back to FIGS. 1–6, a sideways pivotable ramp structure 24 is pivotally connected to the fixed lower nozzle wall 16 and is sideways pivotable between the sidewalls 20 and 22. The pivotable ramp structure 24 includes a longitudinally extending upper pivotable wall 34 spaced upwardly and aftwardly of a longitudinally extending lower pivotable wall 36 and an aftwardly swept pivotable ramp 38 extending between the upper and lower pivotable walls 34 and 36. The sideways pivotable ramp structure 24 may also be described as being sideways pivotable within the outer casing 10, particularly, if there are no clearly definable or identifiable sidewalls 20 and 22 such as in the case of smoothed curved continuous outer nozzle wall 23 extending around to the upper and lower nozzle walls 14 and 16.

The upper pivotable wall 34 includes a widthwise aftwardly tapered section 44 illustrated as having an isosceles triangular planform area 46. The aftwardly tapered section 44 includes side edges 48 extending equi-angularly aftwardly from a base line 50 between the tapered section 44 and a non-tapered section 54 (illustrated as being rectangular) of the upper pivotable wall 34. Taper angles 58 between the side edges 48 and the base line 50 are sized for allowing the side edges 48 to substantially abut respective ones of the sidewalls 20 and 22 when the pivotable ramp structure 24 is pivoted sideways.

An upper triangular surface 80 of the upper nozzle wall 14 bounds nozzle flowpath 40. At least a portion of the upper triangular surface 80 extends aftwardly of the first and second nozzle sidewalls 20 and 22 to an apex 82 of the triangular surface 80. The upper triangular surface 80 extending aftwardly past the first and second nozzle sidewalls 20 and 22 and the outer casing 10 allows vectoring of the exhaust flow 15 by allowing it to expand in the left and right sideway directions LS and RS, respectively, aftward of the outer casing 10.

A fin 62 attached to the pivotable ramp structure 24 along at least longitudinally extending first and second portions 68 and 70 of the lower pivotable wall 36 and the pivotable ramp 38, respectively, provides aerodynamically self-centering the pivotable ramp 38 which is particularly desirable if a failure of an actuation system for pivoting the pivotable ramp should occur. The fin 62 extends longitudinally over a pivot point 72 (illustrated in FIG. 6). The ramp structure 24 is pivotally connected to the lower nozzle wall 16 at the pivot point 72.

Figure 3:
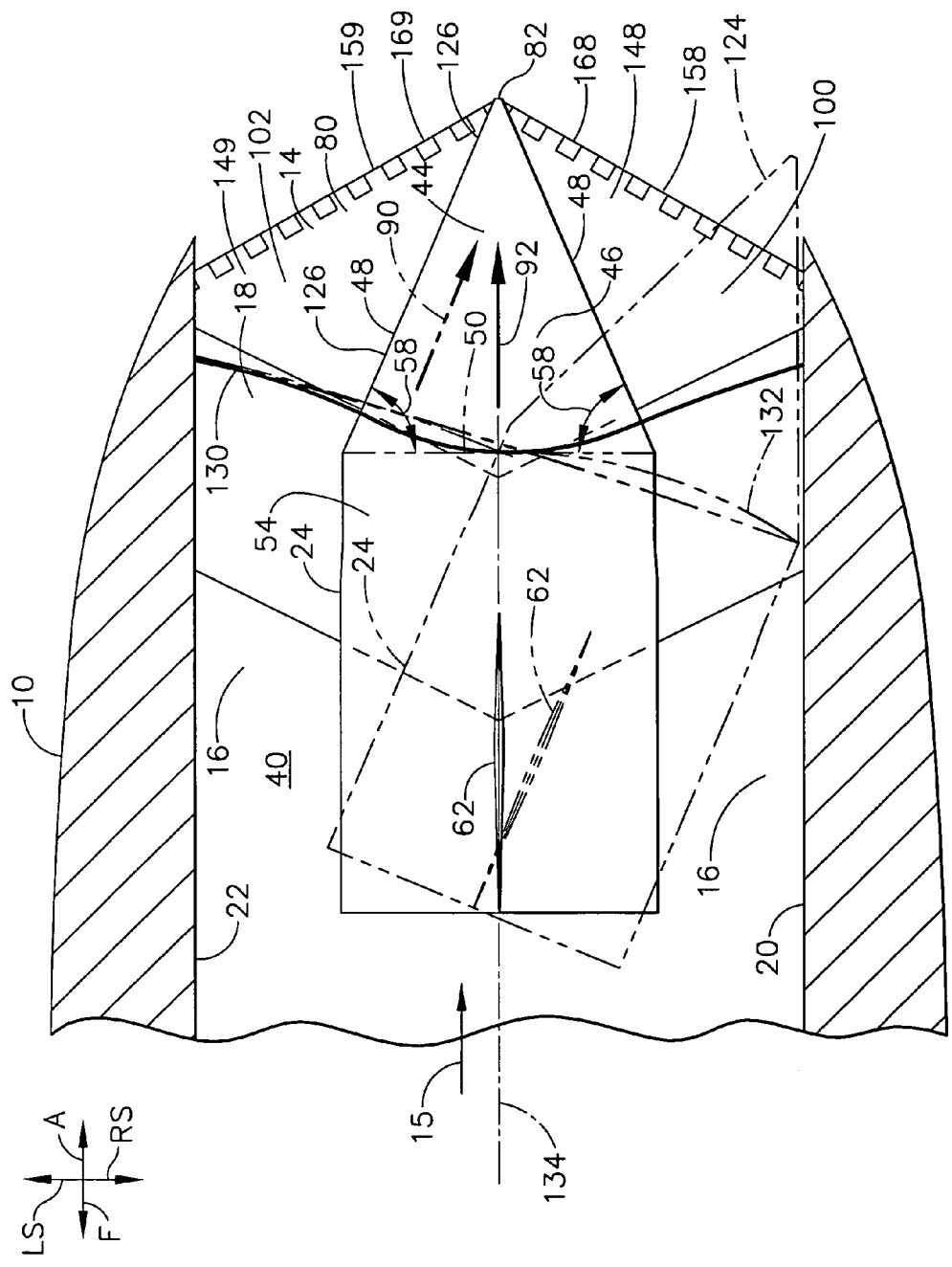
FIG. 3 is a cross-section top looking down view illustration of the vectorable nozzle in FIG. 1 with throat locations illustrated therein.

The throat 28 with the a variable throat area A8, illustrated in FIGS. 3 and 6, of the nozzle 12 extends substantially downwardly across the nozzle flowpath 40 from the outer nozzle wall 23 to the ramp structure 24. A center plane 134 passes through the fin 62 when the ramp structure 24 is in the non-pivoted position 126. The tapered and non-tapered sections 44 and 54 are contoured so that the throat 28 extends widthwise substantially along the base line 50 during vectored and unvectored operation of the nozzle 12. During vectored operation of the nozzle 12, the ramp structure 24 is pivoted fully or partially sideways. FIG. 2 illustrates the ramp structure 24 in a fully sideways pivoted position 124 illustrated in phantom line as compared to a non-pivoted position 126.

FIG. 3 illustrates the exhaust flow 15 vectored sideways forming a sideways vectored nozzle exit flow 90 as compared to an unvectored nozzle exit flow 92 corresponding to the ramp structure 24 in a fully sideways pivoted position 124 and the non-pivoted position 126, respectively. The throat 28 has a substantially symmetric shape 130 about the center plane 134 when the ramp structure 24 is in the non-pivoted position 126 and asymmetric shape 132 about the center plane 134 when the ramp structure 24 is in a vectored position illustrated by the fully sideways pivoted position 124.

Figure 4:
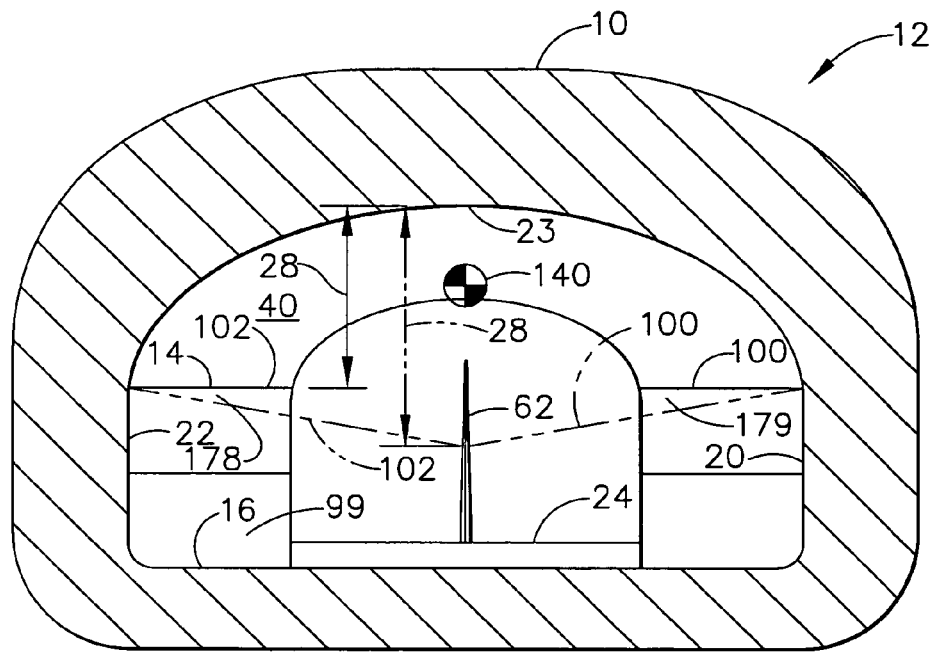
FIG. 4 is a cross-section forward looking aft view illustration of the vectorable nozzle in FIG. 1 with the pivotable ramp not pivoted.
Figure 5:
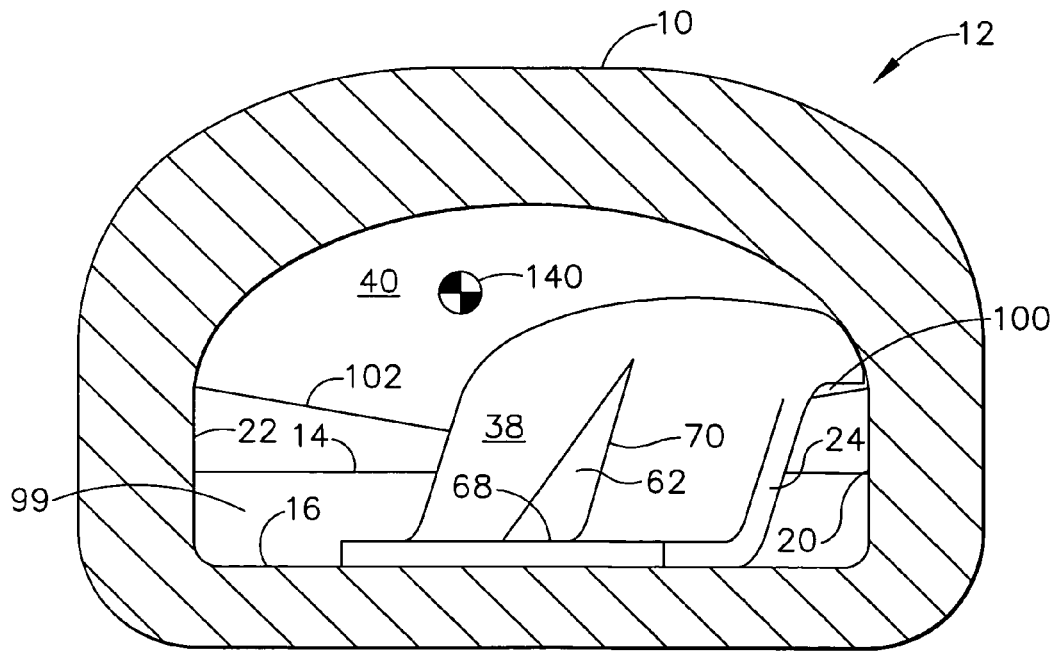
FIG. 5 is a cross-section forward looking aft view illustration of the vectorable nozzle in FIG. 1 with the pivotable ramp fully pivoted.

The vectorable nozzle 12 vectors the thrust by simultaneously shifting the exhaust flow 15 advantageously sideways for vectoring and skewing the exhaust flow 15 flow at the throat 28. FIG. 4 illustrates a center 140 of the exhaust flow 15 centered sideways when the ramp structure 24 is in the non-pivoted position 126 and the thrust and exhaust flow 15 are not vectored. FIG. 5 illustrates the center 140 of the exhaust flow 15 shifted sideways when the ramp structure 24 is in the fully sideways pivoted position 124 and the thrust and exhaust flow 15 are vectored.

Figure 9:
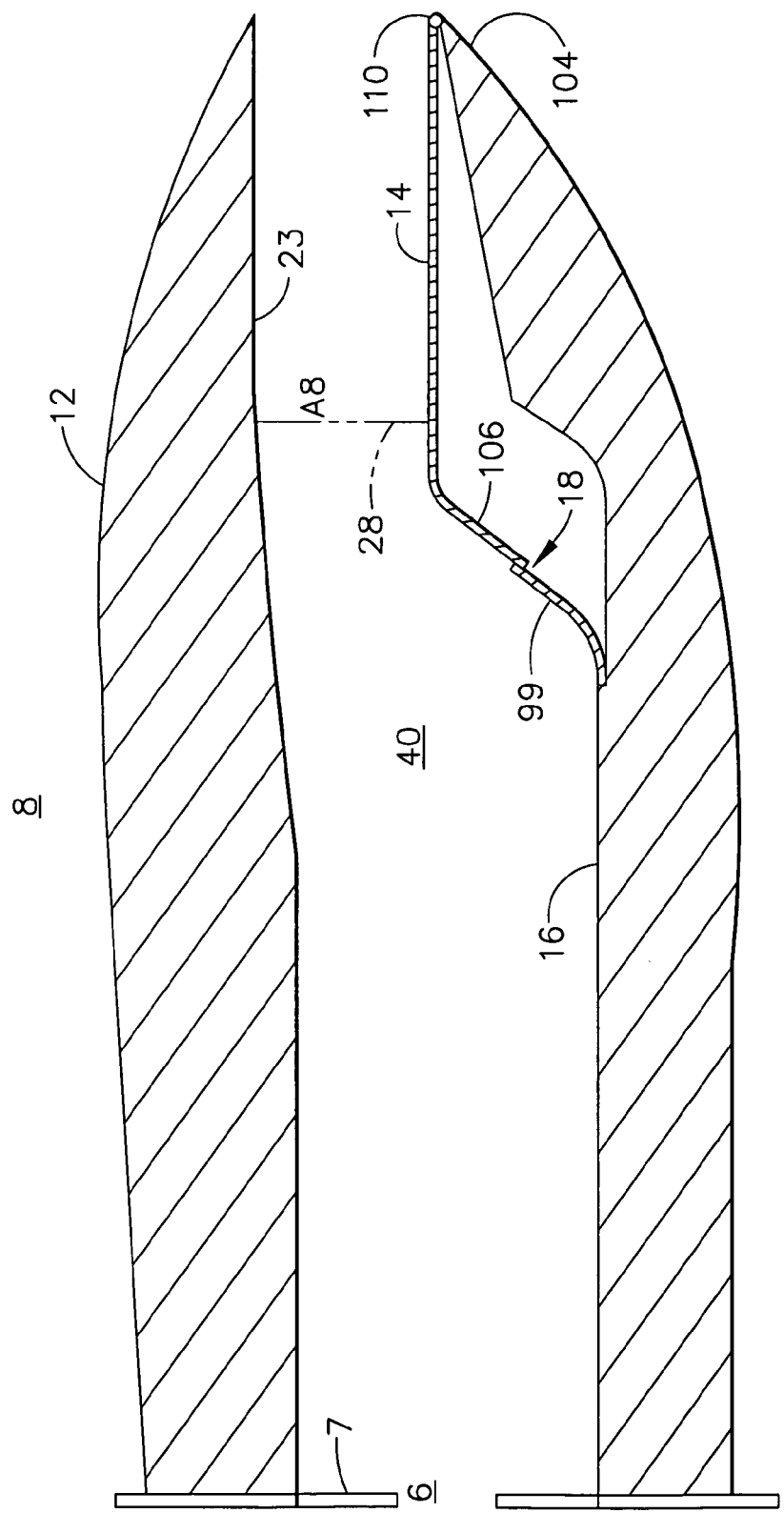
FIG. 9 is a cross-section schematical view illustration of an aircraft gas turbine engine exhaust section with an afterburner and a variable area throat nozzle.

Illustrated in FIG. 9 is a cross-section schematical view illustration of an aircraft gas turbine engine exhaust section 8 with an afterburner 6 and a variable area throat nozzle 12. The nozzle 12 includes a longitudinally extending upper nozzle wall 14 spaced upwardly and aftwardly of a longitudinally extending lower nozzle wall 16. A sideways split and aftwardly swept nozzle ramp 18 extends between upper and lower nozzle walls 14 and 16, respectively. The upper and lower nozzle walls 14 and 16 and the nozzle ramp 18 extend transversely between first and second nozzle sidewalls 20 and 22 of the nozzle 12 as illustrated in FIG. 2. An outer nozzle wall 23 is spaced apart from the upper and lower nozzle walls 14 and 16 and extends transversely between the first and second nozzle sidewalls 20 and 22 such that a nozzle flowpath 40 is defined between the upper and lower nozzle walls 14 and 16 and the outer nozzle wall 23 and the first and second nozzle sidewalls 20 and 22. A variable area throat 28 extends substantially downwardly across the nozzle flowpath 40 from the outer nozzle wall 23 to the upper nozzle wall 14. An upper ramp section 106 of the aftwardly swept nozzle ramp 18 is connected to the upper nozzle wall 14 and the upper nozzle wall 14 is upwardly and downwardly pivotally connected by a hinge 110 to an aft end 104 of the nozzle 12 and operable to vary a throat area A8 of the throat 28. The nozzle 12 varies the throat area A8 by upwardly and downwardly pivoting the assembly of the upper nozzle wall 14 and upper ramp section 106. The upper ramp section 106 is disposed aftwardly and longitudinally behind and in sliding and sealing engagement with a lower ramp section 99 of the aftwardly swept nozzle ramp 18.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. An aircraft gas turbine engine exhaust section comprising:

a variable throat area nozzle spaced axially downstream of an afterburner, the nozzle including a longitudinally extending upper nozzle wall spaced upwardly and aftwardly of a longitudinally extending lower nozzle wall, a sideways split and aftwardly swept nozzle ramp extending between the upper and lower nozzle walls, the upper and lower nozzle walls and the nozzle ramp extending transversely between first and second nozzle sidewalls, an outer nozzle wall spaced apart from the upper and lower nozzle walls, extending transversely between the first and second nozzle sidewalls, a nozzle flowpath defined between the upper and lower nozzle walls and the outer nozzle wall and the first and second nozzle sidewalls, a variable area throat extending substantially downwardly across the nozzle flowpath from the outer nozzle wall to the upper nozzle wall, an upper ramp section of the aftwardly swept nozzle ramp connected to the upper nozzle wall, and the upper nozzle wall being upwardly and downwardly pivotally connected to an aft end of the nozzle and operable to vary a throat area of the throat.

2. An aircraft gas turbine engine exhaust section as claimed in claim 1 further comprising an afterburner located upstream of the vectorable nozzle.

3. A variable throat area nozzle comprising:

a longitudinally extending and longitudinally split upper nozzle wall spaced upwardly and aftwardly of a longitudinally extending lower nozzle wall, a sideways split and aftwardly swept nozzle ramp extending between the upper and lower nozzle walls, the upper and lower nozzle walls and the nozzle ramp extending transversely between first and second nozzle sidewalls, the upper and lower nozzle walls and the nozzle ramp extending transversely between the first and second nozzle sidewalls, an outer nozzle wall spaced apart from the upper and lower nozzle walls, extending transversely between the first and second nozzle sidewalls, a nozzle flowpath defined between the upper and lower nozzle walls and the outer nozzle wall and the first and second nozzle sidewalls, a variable area throat extending substantially downwardly across the nozzle flowpath from the outer nozzle wall to the upper nozzle wall, right hand and left hand upper ramp sections of the aftwardly swept nozzle ramp connected to right hand and left hand upper nozzle wall sections respectively of the upper nozzle wall, and the right hand and left hand upper nozzle wall sections being upwardly and downwardly pivotally connected to an aft end of the nozzle and operable to vary a throat area of the throat.

4. A vectorable nozzle as claimed in claim 3 further comprising:

a sideways pivotable ramp structure pivotally connected to the lower nozzle wall and pivotable between the sidewalls, the pivotable ramp structure including a longitudinally extending upper pivotable wall spaced upwardly and aftwardly of a longitudinally extending lower pivotable wall and an aftwardly swept pivotable ramp extending between the upper and lower pivotable walls, and the variable area throat further extending substantially downwardly across the nozzle flowpath from the outer nozzle wall to the upper pivotable wall.

5. A vectorable nozzle as claimed in claim 4 further comprising the upper pivotable wall including a widthwise aftwardly tapered section.

6. A vectorable nozzle as claimed in claim 5 further comprising the tapered section having an isosceles triangular planform area including side edges extending equi-angularly aftwardly from a base line between the tapered section and a non-tapered section of the upper pivotable wall.

7. A vectorable nozzle as claimed in claim 6 further comprising taper angles between the side edges and the base line and the taper angles sized for allowing the side edges to substantially abut respective ones of the sidewalls when the pivotable ramp structure is pivoted sideways.

8. A vectorable nozzle as claimed in claim 7 further comprising a fin attached to the pivotable ramp structure.

9. A vectorable nozzle as claimed in claim 8 further comprising the fin being attached to the pivotable ramp structure along at least longitudinally extending first and second portions of the lower pivotable wall and the pivotable ramp respectively.

10. A vectorable nozzle as claimed in claim 9 further comprising the fin extending longitudinally over a pivot point where the ramp structure is pivotally connected to the lower nozzle wall.

11. A vectorable nozzle as claimed in claim 5 further comprising:

the upper pivotable wall including a widthwise aftwardly tapered section and a base line between the tapered section and a non-tapered section of the upper pivotable wall, the variable area throat further extending substantially downwardly across the nozzle flowpath from the outer nozzle wall to the upper pivotable wall, and the tapered and non-tapered sections of the upper pivotable wall being contoured so that the throat extends widthwise substantially along the base line during vectored and unvectored operation of the nozzle.

12. A vectorable nozzle as claimed in claim 11 further comprising the tapered section having an isosceles triangular planform area including side edges extending equi-angularly aftwardly from the base line between the tapered and the non-tapered sections of the upper pivotable wall.

13. A vectorable nozzle as claimed in claim 12 further comprising taper angles between the side edges and the base line and the taper angles sized for allowing the side edges to substantially abut respective ones of the sidewalls when the pivotable ramp structure is pivoted sideways.

14. A vectorable nozzle as claimed in claim 13 further comprising a fin attached to the pivotable ramp structure.

15. A vectorable nozzle as claimed in claim 14 further comprising the fin being attached to the pivotable ramp structure along at least longitudinally extending first and second portions of the lower pivotable wall and the pivotable ramp respectively.

16. A vectorable nozzle as claimed in claim 15 further comprising the fin extending longitudinally over a pivot point where the ramp structure is pivotally connected to the lower nozzle wall.

17. A vectorable nozzle as claimed in claim 5 further comprising:

an upper triangular surface of the upper nozzle wall bounding nozzle flowpath, at least a portion of the upper triangular surface extending aftwardly of the first and second nozzle sidewalls to an apex of the triangular surface, the tapered section having an isosceles triangular planform area including side edges extending equi-angularly aftwardly from a base line between the tapered section and a non-tapered section of the upper pivotable wall to the apex, and the right hand and left hand upper nozzle wall sections being upwardly and downwardly pivotally connected along right and left handed triangular sides respectively of the right hand and left hand upper nozzle wall sections to right and left handed triangular side walls of an aft end of the nozzle and operable to vary a throat area of the throat.

18. A vectorable nozzle as claimed in claim 17 further comprising taper angles between the side edges and the base line and the taper angles sized for allowing the side edges to substantially abut respective ones of the sidewalls when the pivotable ramp structure is pivoted sideways.

19. A vectorable nozzle as claimed in claim 18 further comprising a fin attached to the pivotable ramp structure.

20. A vectorable nozzle as claimed in claim 19 further comprising the fin being attached to the pivotable ramp structure along at least longitudinally extending first and second portions of the lower pivotable wall and the pivotable ramp respectively.

21. A vectorable nozzle as claimed in claim 20 further comprising the fin extending longitudinally over a pivot point where the ramp structure is pivotally connected to the lower nozzle wall.

22. A vectorable nozzle as claimed in claim 17 further comprising the tapered and non-tapered sections of the upper pivotable wall being contoured so that the throat extends widthwise substantially along the base line during vectored and unvectored operation of the nozzle.

23. A vectorable nozzle as claimed in claim 22 further comprising taper angles between the side edges and the base line and the taper angles sized for allowing the side edges to substantially abut respective ones of the sidewalls when the pivotable ramp structure is pivoted sideways.

24. A vectorable nozzle as claimed in claim 23 further comprising a fin attached to the pivotable ramp structure.

25. A vectorable nozzle as claimed in claim 24 further comprising the fin being attached to the pivotable ramp structure along at least longitudinally extending first and second portions of the lower pivotable wall and the pivotable ramp respectively.

26. A vectorable nozzle as claimed in claim 25 further comprising the fin extending longitudinally over a pivot point where the ramp structure is pivotally connected to the lower nozzle wall.

27. An aircraft gas turbine engine exhaust section comprising:
   a variable throat area nozzle spaced axially downstream of an afterburner;
   the nozzle including a longitudinally extending and longitudinally split upper nozzle wall spaced upwardly and aftwardly of a longitudinally extending lower nozzle wall,
   a sideways split and aftwardly swept nozzle ramp extending between the upper and lower nozzle walls,
   the upper and lower nozzle walls and the nozzle ramp extending transversely between first and second nozzle sidewalls,
   an outer nozzle wall spaced apart from the upper and lower nozzle walls and extending transversely between the first and second nozzle sidewalls,
   a nozzle flowpath defined between the upper and lower nozzle walls and the outer nozzle wall and the first and second nozzle sidewalls,
   a variable area throat extending substantially downwardly across the nozzle flowpath from the outer nozzle wall to the upper nozzle wall,
   right hand and left hand upper ramp sections of the aftwardly swept nozzle ramp connected to right hand and left hand upper nozzle wall sections respectively of the upper nozzle wall, and
   the right hand and left hand upper nozzle wall sections being upwardly and downwardly pivotally connected along right and left handed triangular sides respectively of the right hand and left hand upper nozzle wall sections to right and left handed triangular side walls of an aft end of the nozzle and operable to vary a throat area of the throat.

28. An aircraft gas turbine engine exhaust section as claimed in claim 27 further comprising:
   a sideways pivotable ramp structure pivotally connected to the lower nozzle wall and pivotable between the sidewalls,
   the pivotable ramp structure including a longitudinally extending upper pivotable wall spaced upwardly and aftwardly of a longitudinally extending lower pivotable wall and an aftwardly swept pivotable ramp extending between the upper and lower pivotable walls, and
   the variable area throat further extending substantially downwardly across the nozzle flowpath from the outer nozzle wall to the upper pivotable wall.

29. An aircraft gas turbine engine exhaust section as claimed in claim 28 further comprising the upper pivotable wall including a widthwise aftwardly tapered section.

30. An aircraft gas turbine engine exhaust section as claimed in claim 29 further comprising the tapered section having an isosceles triangular planform area including side edges extending equi-angularly aftwardly from a base line between the tapered section and a non-tapered section of the upper pivotable wall.

31. An aircraft gas turbine engine exhaust section as claimed in claim 30 further comprising taper angles between the side edges and the base line and the taper angles sized for allowing the side edges to substantially abut respective ones of the sidewalls when the pivotable ramp structure is pivoted sideways.

32. An aircraft gas turbine engine exhaust section as claimed in claim 31 further comprising a fin attached to the pivotable ramp structure.

33. An aircraft gas turbine engine exhaust section as claimed in claim 32 further comprising the fin being attached to the pivotable ramp structure along at least longitudinally extending first and second portions of the lower pivotable wall and the pivotable ramp respectively.

34. An aircraft gas turbine engine exhaust section as claimed in claim 33 further comprising the fin extending longitudinally over a pivot point where the ramp structure is pivotally connected to the lower nozzle wall.

35. An aircraft gas turbine engine exhaust section as claimed in claim 29 further comprising:
   the upper pivotable wall including a widthwise aftwardly tapered section and a base line between the tapered section and a non-tapered section of the upper pivotable wall,
   the variable area throat further extending substantially downwardly across the nozzle flowpath from the outer nozzle wall to the upper pivotable wall, and
   the tapered and non-tapered sections of the upper pivotable wall being contoured so that the throat extends widthwise substantially along the base line during vectored and unvectored operation of the nozzle.

36. An aircraft gas turbine engine exhaust section as claimed in claim 35 further comprising the tapered section having an isosceles triangular planform area including side edges extending equi-angularly aftwardly from the base line between the tapered and the non-tapered sections of the upper pivotable wall.

37. An aircraft gas turbine engine exhaust section as claimed in claim 36 further comprising taper angles between the side edges and the base line and the taper angles sized for allowing the side edges to substantially abut respective ones of the sidewalls when the pivotable ramp structure is pivoted sideways.

38. An aircraft gas turbine engine exhaust section as claimed in claim 37 further comprising a fin attached to the pivotable ramp structure.

39. An aircraft gas turbine engine exhaust section as claimed in claim 38 further comprising the fin being attached to the pivotable ramp structure along at least longitudinally extending first and second portions of the lower pivotable wall and the pivotable ramp respectively.

40. An aircraft gas turbine engine exhaust section as claimed in claim 39 further comprising the fin extending longitudinally over a pivot point where the ramp structure is pivotally connected to the lower nozzle wall.

41. An aircraft gas turbine engine exhaust section as claimed in claim 39 further comprising:
- an upper triangular surface of the upper nozzle wall bounding nozzle flowpath,
- at least a portion of the upper triangular surface extending aftwardly of the first and second nozzle sidewalls to an apex of the triangular surface,
- the tapered section having an isosceles triangular planform area including side edges extending equi-angularly aftwardly from a base line between the tapered section and a non-tapered section of the upper pivotable wall to the apex, and
- the right hand and left hand upper nozzle wall sections being upwardly and downwardly pivotally connected along right and left handed triangular sides respectively of the right hand and left hand upper nozzle wall sections to right and left handed triangular side walls of an aft end of the nozzle and operable to vary a throat area of the throat.

42. An aircraft gas turbine engine exhaust section as claimed in claim 41 further comprising taper angles between the side edges and the base line and the taper angles sized for allowing the side edges to substantially abut respective ones of the sidewalls when the pivotable ramp structure is pivoted sideways.

43. An aircraft gas turbine engine exhaust section as claimed in claim 42 further comprising a fin attached to the pivotable ramp structure.

44. An aircraft gas turbine engine exhaust section as claimed in claim 43 further comprising the fin being attached to the pivotable ramp structure along at least longitudinally extending first and second portions of the lower pivotable wall and the pivotable ramp respectively.

45. An aircraft gas turbine engine exhaust section as claimed in claim 44 further comprising the fin extending longitudinally over a pivot point where the ramp structure is pivotally connected to the lower nozzle wall.

46. An aircraft gas turbine engine exhaust section as claimed in claim 41 further comprising the tapered and non-tapered sections of the upper pivotable wall being contoured so that the throat extends widthwise substantially along the base line during vectored and unvectored operation of the nozzle.

47. An aircraft gas turbine engine exhaust section as claimed in claim 46 further comprising taper angles between the side edges and the base line and the taper angles sized for allowing the side edges to substantially abut respective ones of the sidewalls when the pivotable ramp structure is pivoted sideways.

48. An aircraft gas turbine engine exhaust section as claimed in claim 47 further comprising a fin attached to the pivotable ramp structure.

49. An aircraft gas turbine engine exhaust section as claimed in claim 48 further comprising the fin being attached to the pivotable ramp structure along at least longitudinally extending first and second portions of the lower pivotable wall and the pivotable ramp respectively.

50. An aircraft gas turbine engine exhaust section as claimed in claim 49 further comprising the fin extending longitudinally over a pivot point where the ramp structure is pivotally connected to the lower nozzle wall.

* * * * *